(12) United States Patent
Yamada (10) Patent No.: US 8,423,507 B2
(45) Date of Patent: Apr. 16, 2013

(54) METHOD AND SYSTEM FOR MANAGING REPLICATION OF DATA

(75) Inventor: Hiroyuki Yamada, Tokyo (JP)

(73) Assignee: Murakumo Corporation, Tokyo (JP)

( * ) Notice: Subject to any disclaimer, the term of this patent is extended or adjusted under 35 U.S.C. 154(b) by 0 days.

(21) Appl. No.: 13/257,070

(22) PCT Filed: Mar. 15, 2010

(86) PCT No.: PCT/JP2010/054311
§ 371 (c)(1),
(2), (4) Date: Sep. 16, 2011

(87) PCT Pub. No.: WO2010/106991
PCT Pub. Date: Sep. 23, 2010

(65) Prior Publication Data
US 2012/0011098 A1    Jan. 12, 2012

(30) Foreign Application Priority Data
Mar. 19, 2009    (JP) .................................. 2009-069140

(51) Int. Cl.
*G06F 7/00*    (2006.01)
(52) U.S. Cl.
USPC ........... 707/614; 707/623; 707/628; 707/629; 707/630; 707/631; 707/632
(58) Field of Classification Search .................. None
See application file for complete search history.

(56) References Cited

U.S. PATENT DOCUMENTS
6,049,809 A *    4/2000    Raman et al. .......................... 1/1
6,694,337 B1 *    2/2004    King et al. .................... 707/623
6,889,254 B1 *    5/2005    Chandra et al. ................ 709/224
(Continued)

FOREIGN PATENT DOCUMENTS
JP    2001-028594 A    1/2001
JP    2003-345640 A    12/2003
(Continued)

OTHER PUBLICATIONS

"Data Replication in OceanStore," by Geels, Dennis. IN: Report No. UCB/CSD-02-1217 (2002). Available at: http://citeseerx.ist.psu.edu/viewdoc/download?doi=10.1.1.12.3390&rep=rep1&type=pdf Last Visited: May 15, 2012.*

(Continued)

*Primary Examiner* — Neveen Abel Jalil
*Assistant Examiner* — Daniel Kinsaul
(74) *Attorney, Agent, or Firm* — Westerman, Hattori, Daniels & Adrian, LLP (57) ABSTRACT

Data replication management which enables rapid retrieval while increasing the performance of the entire system, and maintaining data synchronization regarding successively updated data is performed. There are steps which comprises a step that when a slave node which has received an instruction for retrieval does not receive a return massage from a master node within a predetermined time period (Ts1) from the transmission of a request message to the master node, the slave node requests the master node to provide a transaction log up to the latest version with respect to the update of a master database; a step that the master node which has received the request transmits the transaction log to the slave node; and a step that the slave node updates a replica database with reference to the transaction log transferred from the master node.

7 Claims, 4 Drawing Sheets

U.S. PATENT DOCUMENTS

| | | | |
|---|---|---|---|
| 7,233,991 B2* | 6/2007 | Adhikari | 709/224 |
| 7,325,097 B1* | 1/2008 | Darcy | 711/117 |
| 7,523,110 B2* | 4/2009 | Holenstein et al. | 707/623 |
| 7,624,155 B1* | 11/2009 | Nordin et al. | 709/208 |
| 7,664,125 B1* | 2/2010 | Bauer et al. | 370/408 |
| 7,734,585 B2* | 6/2010 | Sharma et al. | 707/623 |
| 7,778,972 B1* | 8/2010 | Cormie et al. | 707/626 |
| 7,853,565 B1* | 12/2010 | Liskov | 707/648 |
| 8,073,881 B1* | 12/2011 | Georgiev | 707/812 |
| 2002/0065879 A1* | 5/2002 | Ambrose et al. | 709/203 |
| 2002/0165724 A1* | 11/2002 | Blankesteijn | 705/1 |
| 2003/0196052 A1 | 10/2003 | Bolik et al. | |
| 2005/0086384 A1* | 4/2005 | Ernst | 709/248 |
| 2007/0091790 A1 | 4/2007 | Passey et al. | |
| 2007/0220059 A1* | 9/2007 | Lu et al. | 707/200 |
| 2009/0013012 A1 | 1/2009 | Ichikawa et al. | |

FOREIGN PATENT DOCUMENTS

| | | |
|---|---|---|
| JP | 2006-293910 A | 10/2006 |
| JP | 2009-015476 A | 1/2009 |
| WO | 97/04391 A1 | 2/1997 |

OTHER PUBLICATIONS

International Search Report of PCT/JP2010/054311, mailing date Jun. 1, 2010.

Notice of Reason for Rejection dayed Dec. 10, 2010, issued in corresponding Japanese Patent Application No. 2010-536265.

Extended European Search Report dated Oct. 31, 2012, issued in corresponding European Patent Application No. 10753483.6.

* cited by examiner

METHOD AND SYSTEM FOR MANAGING REPLICATION OF DATA

CROSS-REFERENCE TO RELATED APPLICATION

This application is based upon and claims the benefit of priority of the prior Japanese Patent Application No. JP2009-069140, filed on Mar. 19, 2009, the entire contents of which are incorporated herein by reference.

FIELD

The present invention relates to a method and system for managing the replication of data, and more specifically relates to a method and system for managing the replication of data between a database of a computer (node) connected to a network and a database of another node to which a search is requested.

BACKGROUND

In recent years, a technology for realizing a replication system by applying a transaction log has been proposed. With a transaction log, it is possible to realize high-speed operation while maintaining the permanence of database changes by recording a history of changes implemented to a database in an area different from a recording area of the database. A history of all updates is stored in a transaction log, thus it is possible to reconstruct all updates of the database as long as the transaction log is stored.

Proposed as a synchronization method of data with a transaction log is a method for completing a synchronization process of data between a master node and slave nodes when a transfer source node (master node) starts keeping a transaction log in a recording area, transfers the same transaction log to all the other nodes existing in a replication system, the transfer destination nodes (slave nodes) notify the master node of completion after completing the receipt of the transaction log, the master node receives the notifications of completion from all the slave nodes, and a recording process in its own recording area ends (see Japanese Patent Application Laid-Open No. 2006-293910, for example). In this method, it is possible to quickly execute a search process since it is unnecessary to inquire again of the master node about the latest information when the slave node makes a search.

However, the above data synchronization method has a problem that whenever a database (a "database" may hereinafter be referred to as "DB") of a master node is changed, deleted and updated ("change, delete, and update" may hereinafter be referred to as "update"), a synchronization process with all replica DBs ("databases of transfer destination nodes" in Patent Document 1) is performed so that if a synchronization process of any replica DB takes time because of a failure in any one of any node and a communication path thereof, it takes time to complete the synchronization process and the performance of an entire system decreases.

A main object of the present invention is to provide a method and system for managing the replication of data, which improve the above problem and encourage an improvement in the performance of the entire system while maintaining synchronization of data sequentially updated and enabling a speedy search through the data.

SUMMARY

According to a first aspect of the present invention, it is characterized in that a slave node that has received a search instruction requests from a master node a transaction log up to the latest version related to updates of a master DB in a case of not receiving a reply message from the master node within a specified time ($T_{s1}$) since the time of the transmission of a request message to the master node, the master node that has received the request transmits the transaction log to the slave node, and the slave node updates a replica DB with reference to the transaction log transferred from the master node.

In the present invention, it is preferable that the slave node that has received the search instruction should update the replica database with reference to an already received transaction log in a case of receiving a reply message from the master node within the specified time ($T_{s1}$). In this manner, it is possible to improve the performance of the entire system particularly when the frequency of searches is not high since the application of the transaction log is delayed and the replica DB is updated after the transaction log is applied only when a search instruction is received.

In the present invention, it is preferable that the master node, which has received an update instruction, should complete an update in accordance with the update instruction after receiving notifications of completion of transfer from all the slave nodes that have received a new request message within a specified time ($T_{r1}$) since the time of the receipt of the request message and completing an update of the master DB. In this manner, the master node can execute a synchronization process with nodes from which a node that takes time for communication is eliminated among the slave nodes and complete an update process speedily even if trouble occurs in any one of any slave node and a communication path thereof.

According to a second aspect of the present invention, it is characterized in that a slave node that has received a search instruction requests a transaction log up to the latest version related to updates of the master DB from a parent node thereof in a case of not receiving a reply message from the parent node within a specified time ($T_{s3}$) since the time of the transmission of a request message to the parent node, that the parent node requests the transaction log from a further parent node thereof is repeated until reaching a node having the transaction log in a case where the parent node does not have the transaction log, that the node having the transaction log that has received the request transmits the transaction log to child nodes thereof and the child nodes that have received the transmission transmit the transaction log further to child nodes of thereof at a lower order is repeated until the slave node receives the transaction log, and the slave node updates a replica DB with reference to the transferred transaction log.

In the present invention, it is preferable that the slave node that has received the search instruction should update the replica DB with reference to an already received transaction log in a case of receiving a reply message from the parent node within the specified time ($T_{s3}$). In this manner, it is possible to improve the performance of the entire system particularly when the frequency of searches is not high since the application of the transaction log is delayed and the replica DB is updated after the transaction log is applied only when a search instruction is received.

In the present invention, it is preferable that each node should transmit a notification of completion of transfer to a parent node thereof after transmitting to child nodes thereof the transaction log up to the latest version related to updates of the master DB and receiving notifications of completion of transfer from all the child nodes that have received a new request message within a specified time ($T_{r3}$) since the time of the receipt of the request message.

In this manner, each of the nodes can execute a synchronization process with nodes from which a node that takes time for communication is eliminated and complete an update process speedily even if trouble occurs in any one of any node and a communication path thereof.

According to a method and system for the replication of data of the present invention, if a slave node that has received a search instruction does not receive a reply message within a specified time since the time of the transmission of a request message to any one of a parent node thereof and a master node, a replica DB is updated with reference to any one of a node having a transaction log up to the latest version and the transaction log transferred from the master node. Therefore, even if trouble occurs in any one of any node and a communication path thereof, it is possible to perform a synchronization process speedily, and a user can make a search by use of a replica DB in synchronization with a master DB. In other words, it is possible to encourage an improvement in the performance of an entire system and provide a speedy search.

DESCRIPTION OF EMBODIMENTS

A detailed description will hereinafter be given of embodiments for carrying out the present invention with reference to the attached drawings. However, the present invention is not interpreted while limiting to this, but various updates, modifications, and improvements can be added based on the knowledge of those skilled in the art without departing from the scope of the present invention. Furthermore, the same reference numerals are attached to the same members as those in a first embodiment in the following embodiments, and the overlapping descriptions will be omitted.

First Embodiment

Figure 1:
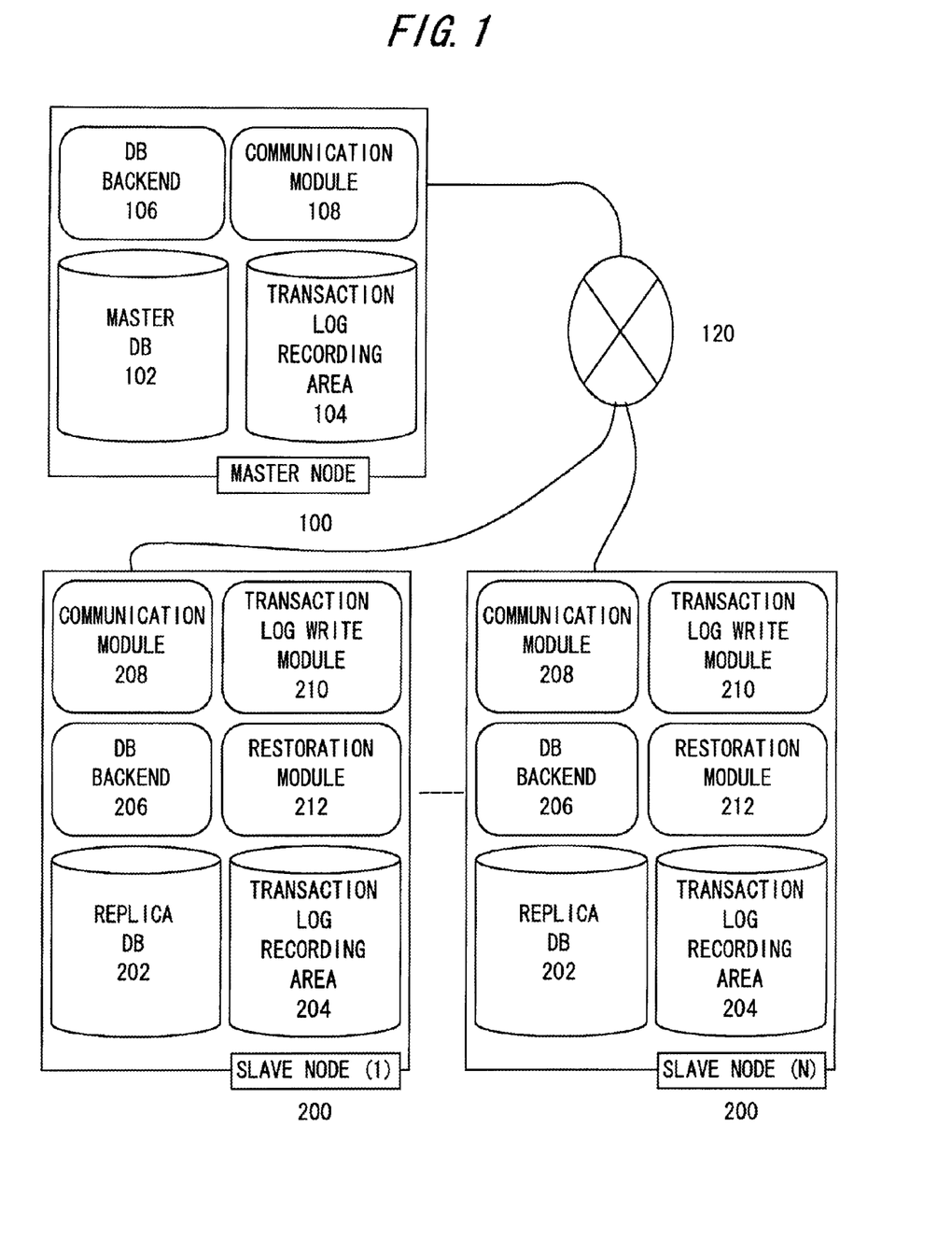
FIG. 1 is an explanatory view illustrating data replication management according to an embodiment of the present invention (first and second embodiments).

FIG. 1 illustrates an outline of data replication management according to a first embodiment of the present invention, and includes a master node 100, and a plurality of (n number) slave nodes connected to the master node 100 via a network 120. Here, all of the plurality of slave nodes has the same configuration, and the same numeral 200 is attached.

The master node 100 has a master DB 102 managed by the master node 100, a transaction log recording area 104 for recording and storing a transaction log, a DB backend 106 for providing a write instruction to the master DB 102 and the transaction log recording area 104, and a communication module 108 for communicating with the slave nodes.

Each of the slave nodes 200 has a replica DB 202 managed by the slave node 200 in a manner of having the content identical with that of the master DB 102 and used as a search target, a transaction log recording area 204 for recording and storing a transaction log, a DB backend 206 for providing a write instruction to the replica DB 202 and the transaction log recording area 204, a communication module 208 for communicating with the master node 100, a transaction log write module 210 for writing a transaction log received from the master node 100 to the transaction log recording area 204, and a restoration module 212 for performing a restoration process of a transaction log and writing to the replica DB 202.

Next, a description will be given of the operation of a data replication management system in the embodiment with reference to FIG. 1.

A data update request of a user enters the DB backend 106 of the master node 100 as an update instruction. The DB backend 106, which has received the update instruction, starts writing to the transaction log recording area 104, and at the same time provides the communication module 108 with a transfer instruction of a transaction log related to new updates.

When ending writing to the transaction log recording area 104, the DB backend 106 starts updating the master DB 102.

As a general rule, the communication module 108, which has received the transfer instruction, transmits the transaction log to the communication modules 208 of all the connected slave nodes 200. After receiving the transaction log, the communication modules 208 transmit the transaction log to the transaction log write modules 210, and the transaction log write modules 210 write the transaction log to the transaction log recording areas 204.

Next, the transaction logs are called by the restoration modules 212 from the transaction log recording areas 204 to be applied to the replica DBs 202, and data replication between the master DB 102 and the replica DB 202 used as a search target is complete.

After waiting to complete replication, the communication modules 208 transmit the completion of transfer to the communication module 108, and the communication module 108 transmit the completion of transfer to the DB backend 106.

When the communication module 108 receives notifications of the completion of the transfer of the transaction log from the communication modules 208 of all the slave nodes 200 and an update of the master DB 102 ends, the update operations in accordance with the data update request (update instruction) of a user is complete.

Figure 2:
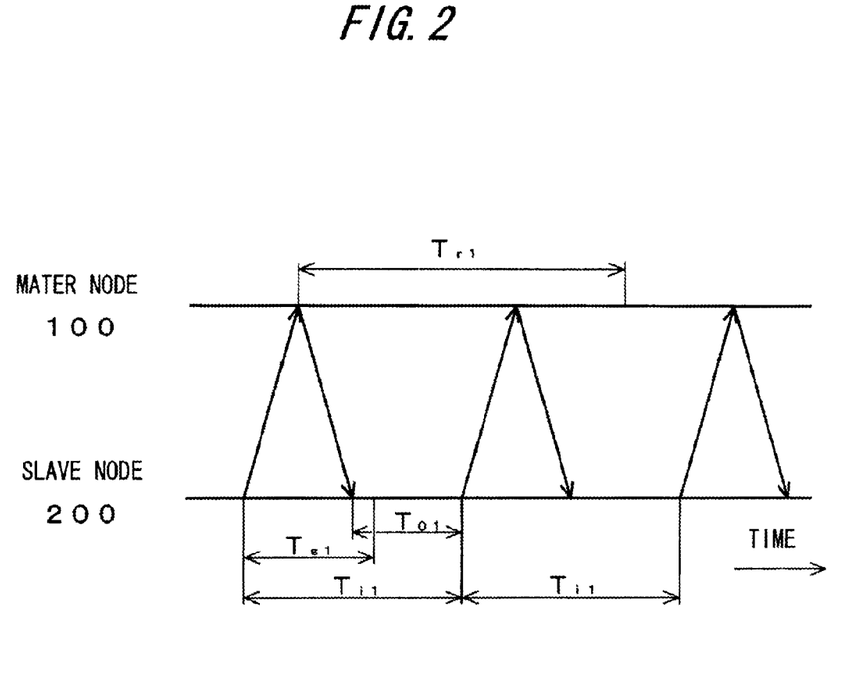
FIG. 2 is an explanatory view illustrating heart beat communication between a slave node and a master node (first and second embodiments).

FIG. 2 is an explanatory view illustrating normal heart beat communication between the slave node 200 and the master node 100. Here, the term heart beat communication is a communication function, wherein request messages are transmitted between the other party in communication at a predetermined interval of time, as the beating of the heart, and receiving a reply message to each request message from the other party within a predetermined period of time, thereby to confirm that a communication line and the other party's node are normally functioning.

The slave nodes 200 transmit a request message of the heart beat communication to the master node 100 respectively at intervals of a specified time $T_{i1}$. Here, the specified time $T_{i1}$ is set to be the time from when the slave node 200 transmits a request message to the master node 100 until a time $T_o$ elapses since the receipt of a reply message.

The master node 100, which has received a request message, transmits a reply message in the heart beat communication to each of the slave nodes 200 that performed transmission. If a reply message does not arrive from the master node 100 within a specified time $T_{s1}$ of when the slave node 200 transmits the request message, some trouble may be occurring in any one of the master node 100 and a communication path thereof. The case of a possible trouble in the master node 100 includes, in addition to the case where the master node itself has been brought down, a case where a load of task processing of the master node is too large so that the master node is not in the state of sending out a reply message within the predetermined time. Further, the case of a possible trouble in the communication path includes, in addition to the case where the communication path itself has been brought down, a case where a load of the communication path is too large so that the communication path is unable to have a reply message arrive within the predetermined time. In other words, although the heart beat communication has not been established due to an excessive load, it may be possible that the master node 100 and the communication path both are functioning, while they have been caused to make delays.

Incidentally, it is also possible to set the specified time $T_{i1}$ to be the time from the transmission of a request message in the heart beat communication until the time $T_{01}$ elapses. Also in this case, if a reply message in the heart beat communication does not arrive from the master node 100 within the specified time $T_{s1}$ since the time of the transmission of a request message, some trouble may be occurring in the system.

If not receiving a reply message from the master node 100 within the specified time $T_{s1}$ since the time of the transmission of the request message, the slave node 200 assumes that some trouble may be occurring in the system and stops transmitting a request message to the master node 100.

The trouble of the system in this case, too, includes, in addition to the case where the master node itself has been brought down, a case where a load of task processing of the master node is too large so that the master node is not in the state of sending out a reply message within the predetermined time. Further, the case of a possible trouble in the communication path includes, in addition to the case where the communication path itself has been brought down, a case where a load of the communication path is too large so that the communication path is unable to have a reply message arrive within the predetermined time. In other words, although the heart beat communication has not been established due to an excessive load, it may be possible that the master node 100 and the communication path both are functioning, while they have been caused to make delays.

Moreover, if not receiving a next new request message from the slave node 200 that transmitted performed transmission within a specified time $T_{r1}$ since the time of the transmission of the reply message, the master node 100, which has received the request message, assumes that some abnormality has occurred in any one of the slave node 200 and a communication path thereof.

Here, the specified time $T_{r1}$ is set to be a sufficiently longer time than the time $T_{s1}$, for example, a time calculated by a formula $T_{r1}=T_{01}+2\times T_{s1}$, in order that the slave node 200 can detect an abnormality simultaneously with the master node 100 or earlier than that.

If the slave node 200 does not receive a reply message even after a lapse of $T_{s1}$ since the master node 100 transmits the reply message, the slave node 200 detects an abnormality. If not detecting an abnormality, the slave node 200 transmits a next request message before $T_{01}+T_{s1}$ elapses since the transmission of the request message. If the master node 100 does not receive a next request message even after a lapse of $T_{s1}$ since the slave node 200 transmits the next request message, the slave node 200 does not receive a reply message even after a lapse of $T_{s1}$ since the transmission of the next request message, and consequently detects an abnormality.

Therefore, if the master node 200 does not receive a new request message for a lapse of $T_{r1}$ ($=T_{01}+2\times T_{s1}$) and detects an abnormality, the slave node 200 either does not receive a reply message to a newest request message within $T_{s1}$ of the transmission of the request message or does not receive a reply message to a next request message within $T_{s1}$ of the transmission of the request message. Therefore, the slave node 200 has already detected an abnormality.

If receiving a data update request from a user, the master node 100 starts writing to the transaction log recording area 104, and at the same time transfers a transaction log related to new updates to the communication module 208 of the slave node 200 that transmitted a new request message within the specified time $T_{r1}$ since the time of the transmission of the reply message. The slave node 200 that has received the transaction log then updates the replica DB 202 and transmits the completion of transfer to the master node 100 as described above.

The slave node 200 that did not transmit a new request message within the specified time $T_{i1}$ is assumed that some abnormality is occurring and the transaction log is not transferred to the communication module 208 thereof.

If receiving notifications of the completion of transfer from all the slave nodes 200 to which the transaction log has been transferred, the master node 100 assumes that the synchronization process of the transaction log is complete even if a notification of the completion of transfer does not arrive from the salve node 200 that does not transmit a new request message. If the synchronization process of the transaction log is complete and an update of its own master DB 102 ends, the data update request from a user is complete.

A data search request of a user enters the DB backend 206 of any slave node 200 as a search instruction, and if the slave node 200 receives a reply message within the specified time $T_{s1}$ since the time of the transmission of the request message to the master node 100, the search requested by a user is made by use of the replica DB 202.

However, if the slave node 200 does not receive a reply message in the heart beat communication within the specified time $T_{s1}$, the communication module 208 requests a transaction log that is not yet obtained and up to the latest version (this may be collectively referred to as a "transaction log up to the latest version" or simply as a "transaction log" in the description) from the communication module 108 of the master node 100. It is possible to reduce the amount of information transmitted and lighten the load of communications by not including a transaction log already obtained by the slave node 200 in a transaction log for which the request is made.

The communication module 108 that has received the request transmits the transaction log up to the latest version to the communication module 208 of the slave node 200 that transmitted the request.

The communication module 208 transmits the received transaction log to the transaction log write module 210, and the transaction log write module 210 writes to the transaction log recording area 204. Next, the transaction log is called by the restoration module 212 from the transaction log recording area 204 to be applied to the replica DB 202, and data replication between the master DB 102 and the replica DB 202 used as a search target is complete.

The search requested by a user is made by use of the replica DB 202.

The slave node 200 that has stopped transmitting a request message since it did not receive a reply message within the specified time $T_{s1}$ since the time the transmission of the request message transmits a request restart message to the master node 100 after a lapse of a specified time since the stop of the transmission of the request message, and afterward requests the transaction log up to the latest version from the master node 100. If receiving a restart permission message within the specified time $T_{s1}$ since the time the transmission of the restart message, the slave node 200 transmits a request message to the master node 100, and afterward transmits a request message to the master node 100 at intervals of the specified time $T_{01}$ after the receipt of a reply message similarly to before the trouble occurred. If not receiving a reply message to the request restart message within a specified time ($T_{s1}$) or receiving a restart reject message, the slave node 200 transmits a request restart message again after a lapse of a specified time.

The master node 100, which has received a request restart message, transmits a restart permission message when assuming that an abnormality occurred in the slave node 200, and adds the slave node 200 to nodes targeted for the synchronization process upon the transfer of a transaction log. If a request for a transaction log up to the latest version is received afterward, the transaction log is transmitted.

The slave node 200 eliminated from the targets of the synchronization process updates the replica DB by acquiring a transaction log up to the latest version upon making a search. Accordingly, it is possible to make a search by use of the replica DB in synchronization with the master DB.

However, the master node 100 transmits a restart reject message when not detecting an abnormality of the slave node 200.

In the first embodiment, as a general rule, whenever receiving an update request from a user, the master node 100 transfers a transaction log related to updates of the master DB 102 to all the slave nodes 200, and completes the update request after confirming that the replica DBs 202 are updated at the slave nodes 200. Hence, there are advantages that the slave node 200 that has received a search instruction can make a search speedily by use of the replica DB 202 that are already kept in the latest state, and the search speed does not decrease even if the frequency of searches is high.

Moreover, if any one of a request and a response to a reply message between the master node 100 and any slave node 200 does not arrive within a specified time, the master node 100 assumes that trouble has occurred in any one of the node and a communication path thereof, eliminates the slave node 200 from the targets of the synchronization process upon update of the master DB 102, and requests a transaction log up to the latest version from the master node 100 whenever the slave node 200 receives a search instruction. Therefore, it is possible to execute the synchronization process at high speed while keeping the slave node 200 in a synchronized state even when trouble occurs.

In the embodiment, the time $T_{r1}$ until the master node 100 receives a new request message after the transmission of a reply message is set to be sufficiently longer than $T_{s1}$ as described above. Accordingly, it is possible to prevent the slave node 200 from judging that the slave node 200 itself has received a transaction log up to the latest version without noticing trouble although the master node 100 detected the trouble and eliminated the slave node 200 from the targets of the synchronization process. In other words, it is possible to prevent a user from making a search by use of the replica DB 202 that is out of synchronization with the updated master DB 102.

After the trouble is restored, the slave node 200 that has detected the trouble can restart transmitting a request message and return to a state before the trouble occurred. With regard to temporary network trouble in between with the slave node 200, it is possible to process an update request speedily by eliminating the slave node 200 from the targets of synchronization when the trouble is occurring, and to process a search request to the slave node 200 speedily by adding the slave node 200 to the targets of synchronization after the restoration. Consequently, it is possible to improve the performance of the entire system.

In the embodiment, it is possible to transmit and receive a request and a reply message, and request and transfer a transaction log by use of the same communication path. Moreover, it is possible to use a communication path in which a message transmitted first arrives first without fail as a communication path. In this manner, it is possible to guarantee that the transfer of a transaction log on the communication path is securely made by confirming the transmission and receipt of a request message and a reply message.

Second Embodiment

FIG. 1 illustrates an outline of data replication management according to a second embodiment of the present invention, and a description will be given of the operation with reference to FIG. 1.

Similarly to the case of the first embodiment, the master node 100, which has received a data update request from a user as an update instruction, starts updating the master DB 102, and as a general rule, transmits a transaction log related to updates of the master DB 102 to the communication modules 208 of all the connected slave nodes 200.

When ending the receipt of the transaction log, the communication modules 208 transmit notifications of the completion of transfer to the communication module 108, and the communication module 108 to the DB backend 106.

When the communication module 108 receives the notifications of the completion of transfer of the transaction log from the communication modules 208 of all the slave nodes 200, and an update of the master DB 102 ends, the update operations in accordance with the data update request (update instruction) of a user is complete.

FIG. 2 illustrates heartbeat communication between the master node 100 and the slave node 200 under normal operating conditions as described in the first embodiment.

A data search request of a user enters the DB backend 206 of any slave node 200 as a search instruction. The DB backend 206 transmits the search instruction to the communication module 208. When the slave node 200 receives a reply message within a specified time $T_{s1}$ since the time the transmission of the request message to the master node 100, the communication module 208 transmits a transaction log up to the latest version that which is owned by the communication module 208 itself to the transaction log write module 210. The transaction log write module 210 writes the transaction log to the transaction log recording area 204.

Next, the transaction log is called by the restoration module 212 from the transaction log recording area 204 to be applied to the replica DB 202. Accordingly, data replication between the master DB 102 and the replica DB 202 used as a search target is complete. The data search request is accomplished by use of the replica DB 202.

The case where the slave node 200 that has received the search instruction does not receive a reply message within the specified time $T_{s1}$ since the time the transmission of the request message to the master node 100 is the same as in the first embodiment, and the aspects described in the first embodiment other than the above in the embodiment are the same as the first embodiment.

The effects specific to the embodiment are as follows.

In the second embodiment, it is sufficient if the master node 100, which has transmitted a transaction log reflecting an update instruction to the slave node 200, simply waits to receive a receipt notification of the transaction log from the communication module 208, and it is unnecessary to wait until the transaction log is applied to the replica DB 202. As a result, it is possible to process the synchronization process speedily upon the transfer of the transaction log.

Furthermore, the slave node 200 that has received the search instruction updates the data of the replica DB 202 with reference to an already received transaction log up to the latest version and makes a search by use of the replica DB 202.

In the embodiment, the application of a transaction log is delayed, and the replica DB is updated by applying a transaction log only when a search instruction is received. Therefore, there is an advantage that it is unnecessary to request again a transaction log up to the latest version from the master node 100.

Third Embodiment

Figure 3:
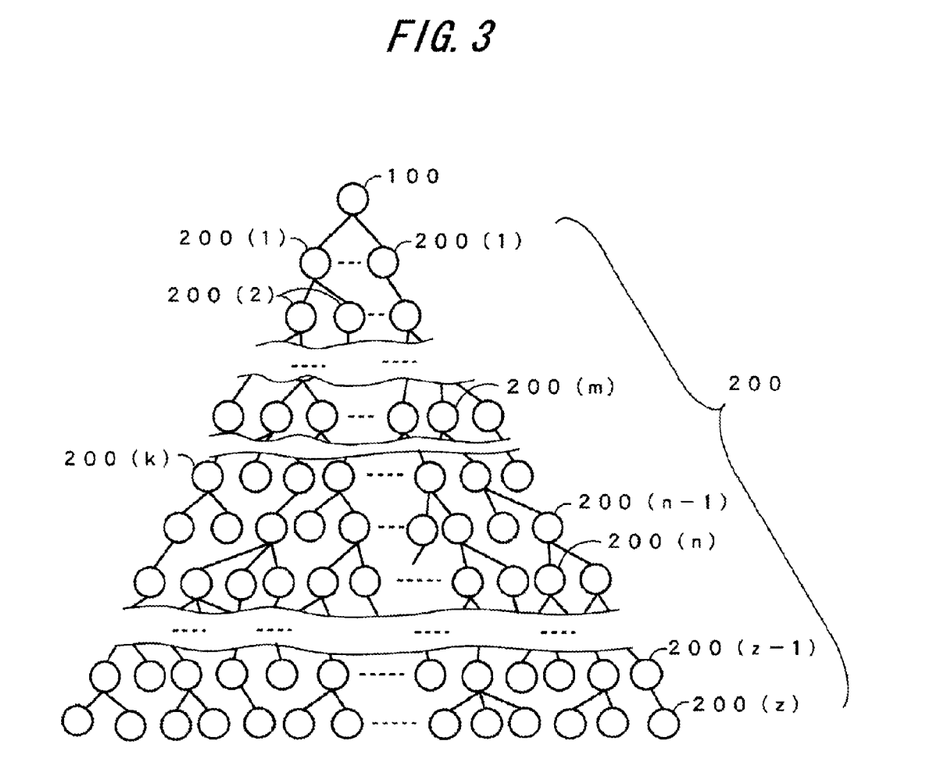
FIG. 3 is an explanatory view illustrating data replication management of a tree structure according to an embodiment of the present invention (third and fourth embodiments).

FIG. 3 is an explanatory view illustrating data replication management of a tree structure used in a third embodiment of the present invention.

Included is a master node 100 as a root of the tree structure, and included is a plurality of slave nodes 200 as the nodes and leaves of the tree structure. The master node is set to be the highest layer, and a slave node positioned in a layer that is n layer lower than the master node 100 is shown as a slave node 200 ($n$).

The nodes are connected directly to nodes positioned one layer lower or upper respectively with a network (unillustrated in FIG. 3) as shown in FIG. 3. In the description, a "child node" of a node indicates a node one layer lower that is connected directly to the node, and a "parent node" of a node indicates a node one layer upper that is connected directly to the node. Moreover, a "leaf node" indicates a node having no child nodes.

A "descendant node" of a node indicates a node that can be reached by descending from the node to lower layers, through a child node of the node and a child node of the child node, along the tree structure. Among descendant nodes, a difference between nodes (leaf nodes) positioned in the lowest layer and a layer where the node is positioned may be referred to as the "height."

The configurations of the master node 100 and the slave nodes 200 are the same as the master node 100 and the slave nodes 200 shown in FIG. 1, respectively.

Next, a description will be given of a method for managing the replication of data according to the third embodiment with reference to FIGS. 1 and 3.

A data update request of a user enters the DB backend 106 of the master node 100 as an update instruction. If receiving the update instruction, the DB backend 106 starts writing to the transaction log recording area 104, and at the same time provides the communication module 108 with a transfer instruction of a transaction log related to the new updates.

When ending writing to the transaction log recording area 104, the DB backend 106 starts updating the master DB 102.

The communication module 108, which has received the transfer instruction of the transaction log related to the new updates, transmits the transaction log to communication modules 208 (1) of all the child nodes 200 (1). The communication modules 208 (1) transmit the received transaction log to the transaction log write modules 210 (1) and instruct to update replica DBs 202 (1) while further transmitting the transaction log to communication modules 208 (2) of all child nodes 200 (2) at a lower order.

The above is repeated until the transaction log is transmitted to communication modules 208 ($z$) of leaf nodes 200 ($z$).

If receiving the transaction log, the communication modules 208 ($z$) perform transmission to transaction log write modules 210 ($z$), and the transaction log write modules 210 ($z$) write the transaction log to transaction log recording areas 204 ($z$).

Next, the transaction logs are called by restoration modules 212 ($z$) from the transaction log recording area 204 ($z$) to be applied to replica DBs 202 ($z$), and data replication between the master DB 102 and the replica DBs 202 ($z$) managed by the leaf nodes 200 ($z$) is complete.

After waiting to complete replication, the communication modules 208 ($z$) transmit the completion of transfer to communication modules 208 ($z$–1) of parent nodes 200 ($z$–1) that transferred the transaction log, and if the communication modules 208 ($z$–1) receive the completion of transfer from all the slave nodes 200 ($z$) to which the transmission was performed as well as an update of data of their own replica DBs 202 ($z$–1) being complete, the communication modules 208 ($z$–1) transmit the completion of transfer to communication modules 208 ($z$–2) of further parent nodes 200 ($z$–2) thereof.

If the above transmission of the completion of transfer is repeated, the communication module 108 of the master node 100 receives the completion of transfer from all the child nodes 200 (1) and an update of the master DB 102 ends, the update operations in accordance with the data update request (update instruction) of a user are complete.

Figure 4:
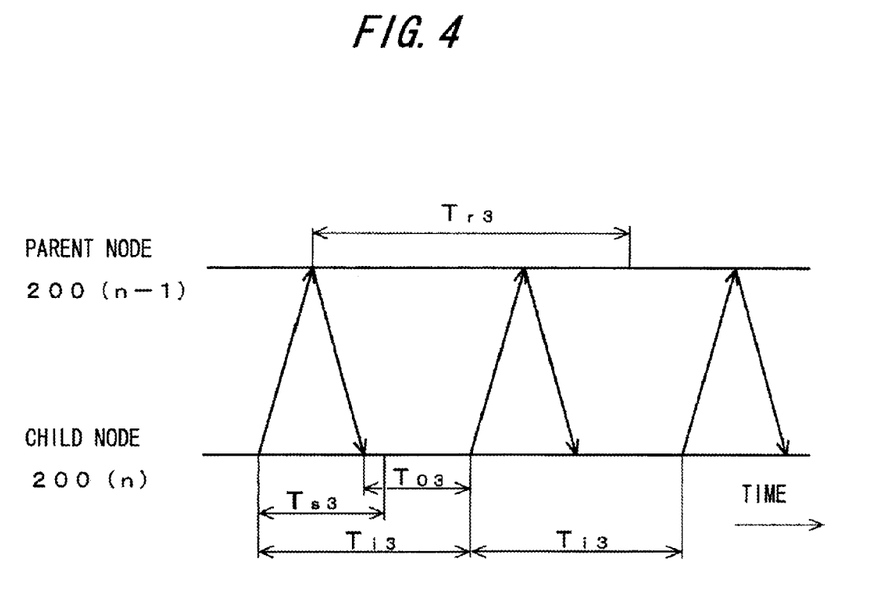
FIG. 4 is an explanatory view illustrating heart beat communication between a slave node and a parent node thereof (third and fourth embodiments).

FIG. 4 is an explanatory view illustrating normal heart beat communication between a slave node 200 ($n$), and any one of the parent nodes 200 ($n$–1) and 100.

The slave node 200 ($n$) transmits a request message in the heat beat communication to the parent node thereof at intervals of a specified time $T_{t3}$. The parent node that has received the request message transmits a reply message in the heat beat communication to the slave node 200 ($n$). If a reply message does not arrive from the parent node within a specified time $T_{s3}$ of when the slave node 200 ($n$) transmitted the request message, some trouble may be occurring in any one of the parent node and a communication path thereof. The case of the trouble of the parent node includes, in addition to the case where the parent node itself has been brought down, a case where a load of task processing of the parent node is too large so that the parent node is not in the state of sending out a reply message within the predetermined time. Further, the case of a possible trouble in the communication path includes, in addition to the case where the communication path itself has been brought down, a case where a load of the communication path is too large so that the communication path is unable to have a reply message arrive within the predetermined time. In other words, although the heart beat communication has not been established due to an excessive load, it may be possible that the parent node and the communication path both are functioning, while they have been caused to make delays.

Here, with regard to the parent node, n being greater than 1 indicates a slave node 200 ($n$–1), and n=1 indicates the master node 100 (they may be collectively referred to as "any one of the parent nodes 200 ($n$–1) and 100" in the description). The specified time $T_{t3}$ is set to be the time from when the slave node 200 ($n$) transmits a request message in the heartbeat communication to the parent node until a the time $T_{O3}$ elapses since the receipt of a reply message.

Incidentally, the specified time $T_{t3}$ can be set to be the time from when the slave node 200 ($n$) transmits a request message in the heart beat communication until the time $T_{O3}$ elapses, too. Also in this case, if a reply message does not arrive from the parent node within the specified time $T_{s3}$ since the time of the transmission of a request message, some trouble may be occurring in the system.

Regarding the trouble of the system in this case, it also includes, in addition to the case where the parent node itself has been brought down, a case where a load of task processing of the parent node is too large so that the parent node is not in the state of sending out a reply message within the predetermined time. Further, the case of a possible trouble in the communication path includes, in addition to the case where the communication path itself has been brought down, a case where a load of the communication path is too large so that the communication path is unable to have a reply message arrive within the predetermined time. In other words, although the heart beat communication has not been established due to an excessive load, it may be possible that the parent node and the communication path both are functioning, while they have been caused to make delays.

If receiving a reply message in the heart beat communication from the parent node thereof within the specified time $T_{s3}$ since the time of the transmission of the request message, the slave node 200 (*n*) assumes itself to own a transaction log up to the latest version.

In contrast, if not receiving a reply message in the heart beat communication from the parent node thereof within the specified time $T_{s3}$, the slave node 200 (*n*) stops transmitting a request message in the heartbeat communication to the parent node. In other words, the slave node 200 (*n*) assumes that some trouble may be occurring in the system, and assumes itself to not own a transaction log up to the latest version.

Regarding the trouble of the system in this case, it also includes, in addition to the case where the parent node itself has been brought down, a case where a load of task processing of the parent node is too large so that the parent node is not in the state of sending out a reply message within the predetermined time. Further, the case of a possible trouble in the communication path includes, in addition to the case where the communication path itself has been brought down, a case where a load of the communication path is too large so that the communication path is unable to have a reply message arrive within the predetermined time. In other words, although the heart beat communication has not been established due to an excessive load, it may be possible that the parent node and the communication path both are functioning, while they have been caused to make delays.

Moreover, if a request message arrives from a child node 200 (*n*+1) of the slave node 200 (*n*) that has stopped transmitting a request message, the slave node 200 (*n*) does not transmit a reply message thereto. Hence, the child node 200 (*n*+1) does not receive a reply message even after a lapse of the specified time $T_{s3}$. Accordingly, the child node 200 (*n*+1) does not transmit an answer message to a child node 200 (*n*+2) of the child node. This process is repeated until reaching all the descendent nodes.

Incidentally, assuming the height of the slave node 200 (*n*) in the tree structure is q, a maximum time $T_{m3}$ required from when the slave node 200 (*n*) stops transmitting a reply message until all the descendent nodes detect trouble can be calculated as a function $T_{m3}=f(T_{03}, T_{s3}, q)$ where $T_{03}$, $T_{s3}$ and q are variables, and becomes longer as q becomes greater.

Moreover, if a new request message does not arrive from the slave node 200 (*n*) that has received the request message within a specified time $T_{r3}$ since the time of the transmission of the reply message, any one of the parent nodes 200 (*n*−1) and 100 of the slave node 200 (*n*) assumes that some abnormality occurred in any one of the slave node 200 (*n*) and a communication path thereof. Here, $T_{r3}$ is set to be a definitely longer time than the time that the slave node 200 (*n*) and all the descendent nodes detect the abnormality. As an example, $T_{r3}$ is set to be a time calculated by a formula $T_{r3}=T_{03}+2\times T_{s3}$ $T_{m3}$.

The slave node 200 (*n*) detects the abnormality by a lapse of the time T ($=T_{03}$ $2\times T_{s3}$) since the transmission of the reply message and stops returning a reply message to a request message from a child node thereof. Assuming the height of the slave node 200 (*n*) in the tree structure is q, all the descendent nodes of the slave node 200 (*n*) detect the abnormality after a further lapse of the time $T_{m3}$ calculated by the specified function $T_{m3}=f(T_{03}, T_{s3}, q)$ since that point in time. Consequently, assuming $T_{r3}=T_{03}+2\times T_{s3}$ $T_{m3}$, the time $T_{r3}$ is caused to be a longer time than a time required for the slave node 200 (*n*) and all descendent nodes thereof to detect the abnormality.

Any one of the parent nodes 200 (*n*−1) and 100 that has assumed some trouble has occurred transfers the transaction log to communication modules 208 (*n*) of the slave nodes 200 (*n*) that transmitted a new request message within the specified time $T_{r3}$ since the time of the transmission of the reply message, but does not transfer the transaction log to the communication modules 208 (*n*) of the slave nodes 200 (*n*) that did not transmit a new request message within the specified time $T_{r3}$.

If receiving notifications of the completion of transfer from all the nodes 200 (*n*) to which the transaction log is transferred, the parent node assumes that the synchronization process of the transaction log is complete even if a notification of the completion of transfer does not arrive from the slave node 200 (*n*) that does not transmit a new request message. In a case where the parent node is the slave node 200 (*n*−1), if the synchronization process of the transaction log is complete and an update of the replica DB 202 (n−1) managed by itself ends, the parent node transmits a notification of the completion of transfer to any one of the further parent nodes 200 (*n*−2) and 100. In a case where the parent node is the master node 100, if the synchronization process of the transaction log is complete and an update of its own master DB 102 ends, the data update request of a user is complete.

A data search request of a user enters a DB backend 206 (*k*) of any slave node 200 (*k*) as a search instruction, and the slave node 200 (*k*) transmits a request message to any one of the parent nodes 200 (*k*−1) and 100. If the slave node 200 (*k*) receives a reply message from the parent node within the specified time $T_{s3}$ since the time of the transmission, the data search is made by use of a replica DB 202 (*k*).

However, if a reply message in the heart beat communication is not received from the parent node within the specified time $T_{s3}$, the DB backend 206 (*k*) of the slave node 200 (*k*) transmits the search instruction to a communication module 208 (*k*), and the communication module 208 (*k*) requests a transaction log up to the latest version related to updates of the master DB 102 from any one of communication modules 208 (*k*−1) and 108 of the parent node.

If the parent node is any one of a slave node 200 (*k*−1) that owns the transaction log and the master node 100, any one of the communication modules 208 (*k*−1) and 108 of the parent node transmits the transaction log to the communication module 208 (*k*) of the slave node 200 (*k*).

If the parent node is the slave node 200 (*k*−1) that does not own the transaction log, the communication module 208 (*k*−1) requests any one of communication modules 208 (*k*−2) and 108 (in a case of k=2) of a further parent node thereof to transfer the transaction log after a lapse of a specified time since the receipt of the request for the transaction log from the communication module 208 (*k*).

As described above, if the request for transfer of a transaction log up to the latest version is repeated and reaches any one of a slave node 200 (*m*) that owns the transaction log and the master node 100, any one of communication modules 208 (*m*) and 108 thereof transmits the transaction log to any one of communication modules 208 (*m*+1) and 208 (1) of any one of child nodes 200 (*m*+1) and 200 (1) that has transmitted the request for transfer. Any one of the communication modules 208 (*m*+1) and 208 (1) that has received the transaction log performs transmission to any one of communication modules 208 (*m*+2) and 208 (2) of any one of child nodes 200 (*m*+2) and 208 (2) of the child node that transmitted the request for transfer. Similar transfer is repeated, and the communication module 208 (*k*) of the slave node 200 (*k*) obtains the transaction log.

The communication module 208 (*k*) transfers the transaction log to a transaction log write module 210 (*k*), and the transaction log write module 210 (*k*) writes to a transaction log recording area 204 (*k*).

Next, the transaction log is called by a restoration module 212 (*k*) from the transaction log recording area 204 (*k*) to be applied to a replica DB 202 (*k*), and data replication between the master DB 102 and the replica DB 202 (*k*) used as a search target is complete.

The slave node 200 (*n*) that has stopped transmitting a request message since not receiving a reply message from any one of the parent nodes 200 (*n*−1) and 100 within the specified time $T_{s3}$ since the time of the transmission of the request message transmits a request restart message to the parent node after a lapse of the time $T_{m3}$ calculated by the formula $T_{m3}=f(T_{O3}, T_{s3}, q)$ since the stop of the transmission of the request message, and afterward requests a transaction log up to the latest version from the parent node. If not receiving a restart permission message to the request restart message within the specified time $T_{s3}$ since the time of the transmission of the request restart message or receiving a restart reject message, the slave node 200 (*n*) transmits a request restart message again after a lapse of a specified time.

If receiving a restart permission message within the specified time $T_{s3}$ since the time of the transmission of the restart message, the slave node 200 (*n*) transmits a request message to the parent node, and afterward transmits a request message to the parent node at intervals of a specified time $T_{s1}$ after the receipt of the reply message, similarly to before detecting the abnormality.

If the parent node that received the request restart message has already assumed that an abnormality occurred in the slave node 200 (*n*), and the node itself owns a transaction log up to the latest version, the parent node transmits a restart permission message and adds the node 200 (*n*) to nodes targeted for the transfer of a transaction log. Moreover, if receiving a request for a transaction log up to the latest version afterward, the parent node transmits a transaction log up to the latest version owned by itself. If the parent node has not yet assumed that an abnormality occurred in the slave node 200 (*n*) or the node itself does not own a transaction log up to the latest version, the parent node transmits a restart reject message.

As described above, after the trouble is restored, the slave node 200 (*n*) restarts transmitting a request message first. Accordingly, the slave node 200 (*n*) is caused to own a transaction log up to the latest version. As a result, the child node 200 (*n*+1) thereof restarts transmitting a request message. Hence, a request message restarts being transmitted in descending order of layers, from the slave node 200 (*n*) on down to all the descendent nodes, and all the descendent nodes eventually return to a state before the trouble occurred.

In this manner, if receiving a search instruction, the slave node 200 (*n*) eliminated from the targets of the synchronization process updates the replica DB by acquiring a transaction log up to the latest version upon making a search. Accordingly, it is possible to make a search by use of the replica DB in synchronization with the master DB.

In the third embodiment, in a structure including the master node 100 being a master node as the root of the tree structure and the plurality of slave nodes 200 being slave nodes as the nodes and leaves of the tree structure, a transaction log related to updates of the master DB is transferred as a general rule to all the slave nodes 200 on every update, and the replica DB 202 is updated at each of the slave nodes 200. Therefore, there are advantages that the slave node 200 that receives a search request from a user can make a search speedily by use of the replica DB 202 and a search speed does not decrease even if the frequency of searches is high.

Moreover, if there is no response to anyone of a request message and a response message between any connected nodes within a specified time, it is assumed that some trouble has occurred, and the master node 100, which has received an update request, and the slave node 200 that has received a transaction log eliminate a child node 200 that has not received a request message from the targets of the synchronization process, and if not receiving a reply message, the slave node 200 that has received a search request requests a transaction log up to the latest version from a parent node thereof. Hence, it is possible to execute the synchronization process at high speed while keeping the slave node 200 in a synchronous state even when trouble occurs.

In the embodiment, the time $T_{r3}$ from when a parent node transmits a reply message until when the parent node receives a new request message from the child node is set, considering $T_{O3}$, $T_{s3}$ and the height q of the child node in the tree structure. As a result, it is possible to prevent all slave nodes 200 that are a child node 200 and all descendent nodes thereof, from judging to have received a transaction log up to the latest version without noticing trouble although a parent node detects the trouble and eliminates the child node from the targets of the synchronization process. In other words, it is possible to prevent a search from being made by use of the replica DB 202 that is out of synchronization with the updated master DB 102.

After the trouble is restored, the slave node 200 that could not receive a reply message and detected the trouble can restart transmitting a request message and return to a state before the trouble occurred. With regard to temporary network trouble in between with the slave node 200, there is an advantage that the performance of the entire system can be improved since it is possible to process an update request speedily by eliminating the slave node 200 from the targets of synchronization for an update request if the trouble is occurring, and it is possible to process a search request to the slave node 200 speedily by adding the slave node 200 to the targets of synchronization after the trouble is restored.

In the embodiment, if requests for a transaction log up to the latest version arrive from other child nodes of the slave node 200 (*n*−1) within a specified time since the time of the receipt of the request for the transaction log from the communication module 208 (*n*), all the requests can be transmitted together to a further parent node thereof. In this manner, it is possible to lighten the load of the network traffic.

Furthermore, in the embodiment, it is possible to transmit and receive a request and a reply message, and request and transfer a transaction log by use of the same communication path. Moreover, it is possible to use a communication path in which a message transmitted first arrives first without fail as a communication path. In this manner, it is possible to guarantee that the transfer of a transaction log on the communication path is securely made by confirming the transmission and receipt of a request message and a reply message.

Fourth Embodiment

FIG. 3 illustrates an outline of data replication management according to the second embodiment of the present invention, and a description will be given of the operation with reference to FIGS. 1 and 3.

The communication module 108, which has received a transfer instruction of a transaction log related to new updates from the DB backend 106 of the master node 100, which received a data update request from a user, transfers the transaction log to communication modules 208 (1) of all child nodes 200 (1) thereof. The communication modules 208 (1) that have received the transaction log transfer the transaction log further to communication modules 208 (2) of all child nodes 200 (2) thereof at a lower order, respectively.

The above is repeated until communication modules 208 (z) of leaf nodes 200 (z) receive the transaction log.

If receiving the transaction log, the communication modules 208 (z) of the leaf nodes 200 (z) transmit the completion of transfer to communication modules 208 (z−1) of parent nodes thereof. If receiving the completion of transfer from all the leaf nodes 200 (z) to which the transfer was performed, the communication modules 208 (z−1) transmit the completion of transfer to communication modules 208 (z−2) of further parent nodes thereof.

If the above transmission of the completion of transfer is repeated, the communication module 108 of the master node 100 receives the completion of transfer from all the slave nodes 200 (1) and an update of the master DB 102 ends, the update operations in accordance with the data update request (update instruction) of a client is complete.

A search requested by a user enters a DB backend 206 (k) of any slave node 200 (k). If the slave node 200 (k) receives a reply message within a specified time $T_{s3}$ since the time of the transmission of a request message to any one of a node 200 (n−1) one layer upper and the master node 100, and itself does not detect an abnormality, the search is made by use of a replica DB 202 (k).

A data search request of a user enters the DB backend 206 (k) of any slave node 200 (k) as a search instruction. The DB backend 206 (k) transmits the search instruction to a communication module 208 (k). If receiving a reply message within the specified time $T_{s3}$ of when the slave node 200 (k) transmits a request message to any one of a parent node 200 (k−1) thereof and the master node 100, the communication module 208 (k) transmits a transaction log up to the latest version owned by itself to a transaction log write module 210 (k). The transaction log write module 210 writes the transaction log to a transaction log recording area 204 (k).

Next, the transaction log is called by a restoration module 212 (k) from the transaction log recording area 204 (k) to be applied to the replica DB 202 (k). Accordingly, data replication between the master DB 102 and the replica DB 202 (k) used as a search target is complete, and the data search request is accomplished by use of the replica DB 202 (k).

A case where the slave node 200 (k) that receives the search instruction does not receive a reply message within the specified time $T_{s3}$ is the same as in the third embodiment, and the aspects described in the third embodiment other than the above in the embodiment are the same as in the third embodiment.

Effects specific to the embodiment are as follows.

In the fourth embodiment, it is sufficient if the parent node 200 (k−1) that has transmitted a transaction log reflecting an update instruction to the slave node 200 (k) simply waits to receive a notification of the receipt of the transaction log from the communication module 208 (k). Accordingly, it is unnecessary to wait until the transaction log is applied to the slave DB 202 (k). Therefore, it is possible to process the synchronization process speedily at the time of transfer of a transaction log.

Furthermore, the slave node 200 (k) that has received a search instruction updates data of the replica DB 202 (k) with reference to an already received transaction log up to the latest version and makes a search by use of the replica DB 202 (k).

In the embodiment, there is an advantage that it is unnecessary to request a transaction log up to the latest version again from the parent node since a replica DB is updated by delaying the application of a transaction log and applying the transaction log only when a search instruction is received.

As described above, it is possible to use the present invention as a DB management system that can make a search while ensuring consistency of information sequentially updated between a plurality of sites.

The invention claimed is:

1. A method for managing replication of data between a master database managed by a master node and replica databases managed by a plurality of slave nodes connected to a tree structure having the master node as a root in a manner of having contents identical with that of the master database and which are used as search targets, the method comprising:
the slave node, which has received a search instruction to search the data, transmitting to a parent node of the slave node a request for a transaction log up to the latest version related to an update of the master database, in a case of not receiving a reply message in a heart beat communication from the parent node within a predetermined time (Ts3) from the time of transmission of a request message in the heart beat communication to the parent node of the slave node;
when the parent node which has received the request does not have the transaction log, the parent node which has received the request makes a request to its parent node for the transaction log, wherein the request is repeated to further parent nodes higher in the tree structure until a parent node having the transaction log is reached;
the parent node, which has received the request and has the transaction log, transmits the transaction log to its child nodes, wherein the transmitting is repeated from each node to its child nodes until the slave node which has received the search instruction receives the transaction log; and
the slave node updating the replica database by referring to the received transaction log.

2. The method for managing replication of data according to claim 1, further comprising the slave node updating the replica database by referring to the already received transaction log, in a case of receiving a reply message in the heart beat communication from the parent node within the predetermined time ($T_{s3}$) from the time of transmission of a request message in the heart beat communication to the parent node of the slave node.

3. The method for managing replication of data according to claim 1 or 2, further comprising the node in the tree structure having the transaction log transmitting, after transmission to the child node the transaction log up to the latest version related to updates of the master database and upon receipt of a notification of completion of transfer from each of all child nodes from which the node have received a new request message within the predetermined time ($T_{r3}$) from the time of receiving the request message, a notification of completion of transfer to its parent node.

4. The method for managing replication of data according to claim 1 or 2, further comprising the node, which does not have the transaction log up to the latest version related to updates of the master database and when it has received requests for the transaction log from any of the child nodes of the node, requesting for the transaction log to the parent node of the node, by collecting the requests from the child nodes.

5. The method for managing replication of data according to claim 3, further comprising the node, which does not have the transaction log up to the latest version related to updates of the master database and when it has received requests for the transaction log from any of the child nodes of the node, requesting for the transaction log to the parent node of the node, by collecting the requests from the child nodes.

6. A system for managing replication of data between a master database managed by a master node and replica databases managed by a plurality of slave nodes connected to a tree structure having the master node as a root in a manner of having contents identical with that of the master database and which are used as search targets, the system comprising:

means for transmitting, from the slave node which has received a search instruction to search the data, to a parent node of the slave node, a request for a transaction log up to the latest version related to an update of the master database, in a case of not receiving a reply message in a heart beat communication from the parent node within a predetermined time (Ts3) from the time of transmission of a request message in the heart beat communication to the parent node of the slave node;

means for making a request for the transaction log, from the parent node which has received the request and does not have the transaction log, to its parent node, wherein the request is repeated to further parent nodes higher in the tree structure until a parent node having the transaction log is reached;

means for transmitting the transaction log, from the parent node which has received the request and has the transaction log, to its child nodes, wherein the transmitting is repeated from each node to its child until the slave node which has received the search instruction receives the transaction log; and     means for updating the replica database of the slave node by referring to the received transaction log.

7. The system of managing replication of data according to claim 6, further comprising:

means for causing the slave node to update the replica database by referring to the transaction log, which has been already received, according to the search instruction, when a reply message has been received from the parent node within the predetermined time ($T_{s3}$) from the time of transmission of the request message to the parent node of the slave node.

* * * * *